United States Patent [19]

Hammel et al.

[11] Patent Number: 4,842,620

[45] Date of Patent: Jun. 27, 1989

[54] PROCESS OF GAS ENRICHMENT WITH POROUS SILICEOUS-CONTAINING MATERIAL

[75] Inventors: Joseph J. Hammel, Pittsburgh; Walter J. Robertson, Aspinwall; William P. Marshall, Pittsburgh; Herbert W. Barch, Natrona Heights; Balbhadra Das, Allison Park; Michael A. Smoot, Oakmont; Richard P. Beaver, Library, all of Pa.

[73] Assignee: PPG Industries, Inc., Pittsburgh, Pa.

[21] Appl. No.: 127,150

[22] Filed: Dec. 1, 1987

Related U.S. Application Data

[63] Continuation-in-part of Ser. No. 871,731, Jun. 6, 1986, abandoned.

[51] Int. Cl.$^4$ .............................................. B01D 53/22
[52] U.S. Cl. .......................................... 55/16; 55/68; 55/158; 65/5; 65/31
[58] Field of Search ................... 55/16, 158, 68; 65/5, 65/31

[56] References Cited

U.S. PATENT DOCUMENTS

| 2,106,744 | 2/1938 | Hood et al. |
|---|---|---|
| 2,215,039 | 9/1940 | Hood et al. |
| 2,221,709 | 11/1940 | Hood et al. |
| 2,286,275 | 6/1942 | Hood et al. |
| 2,461,841 | 2/1949 | Nordberg . |
| 2,494,259 | 1/1950 | Nordberg . |
| 3,019,853 | 2/1962 | Kohman et al. ............... 55/16 |
| 3,022,858 | 2/1962 | Tillyer et al. .................. 55/16 |
| 3,100,868 | 8/1963 | McAfee, Jr. ................ 55/16 X |
| 3,135,591 | 6/1964 | Jones ......................... 55/158 X |
| 3,184,899 | 5/1965 | Frazier ......................... 55/16 |
| 3,258,896 | 7/1966 | Müller ........................... 55/16 |
| 3,262,251 | 7/1966 | Hicks, Jr. ..................... 55/158 |
| 3,269,817 | 8/1966 | Bondley .................... 55/16 X |
| 3,279,902 | 10/1966 | Gardner .................... 55/16 X |
| 3,294,504 | 12/1966 | Hicks, Jr. ................. 55/16 X |
| 3,416,953 | 12/1968 | Gutzeit et al. ............ 65/3.4 X |
| 3,511,031 | 5/1970 | Ketteringham et al. ..... 55/16 X |
| 3,549,524 | 12/1970 | Haller ....................... 55/386 X |
| 3,567,666 | 3/1971 | Berger ...................... 55/158 X |
| 3,570,673 | 3/1971 | Dutz et al. ................ 55/386 X |
| 3,650,721 | 3/1972 | Hammel et al. ............. 65/2 X |
| 3,817,764 | 6/1974 | Wolf ............................ 501/38 |
| 3,843,341 | 10/1974 | Hammel et al. ............... 65/22 |
| 3,923,533 | 12/1975 | Hammel et al. ............... 106/54 |
| 3,923,688 | 12/1975 | Hammel et al. ............ 106/54 X |
| 3,966,481 | 6/1976 | Atkinson et al. ............. 501/38 |
| 3,972,720 | 8/1976 | Hammel et al. ............... 106/54 |
| 3,972,721 | 8/1976 | Hammel et al. ............ 106/54 X |
| 4,042,359 | 8/1977 | Schnabel et al. ................ 65/2 |
| 4,482,360 | 11/1984 | Taketomo et al. ............... 55/16 |
| 4,583,996 | 4/1986 | Sakata et al. ................. 55/16 |

FOREIGN PATENT DOCUMENTS

| 186128 | 7/1986 | European Pat. Off. |
| 186129 | 7/1986 | European Pat. Off. |
| 188811 | 7/1986 | European Pat. Off. |
| 159502 | 10/1982 | Japan ...................... 210/500.23 |
| 886043 | 1/1962 | United Kingdom ............. 55/16 |
| 1271811 | 4/1972 | United Kingdom . |

OTHER PUBLICATIONS

Schnabel, "New Stabilized Reverse-Osmosis Membranes From Porous Glass", Arcc. 5th International Symposium on Fresh Water the Sea, vol. 4, 409–415, 1976.

Kostina et al., "Gas Permeability of Microporous Glass Membranes", Stekio: Keramika, No. 7, pp. 14–15, Jul. 1982.

Bahat et al., "Hollow Fiber Glass Membrane", J. of Applied Polymer Sc., Applied Polymer Symposium, 31, pp. 389–395, 1977.

Kameyama et al., "Differential Permeation of Hydrogen Sulfide through a Microporous Vycor-Type Glass Membrane . . . ", Separation Sc. & Tech., 14(10) pp. 953–957, 1979.

McMillan et al., "Microporous Glasses for Reverse Osmosis", J. of Material Science, 11, pp. 1187–1199 (1976).

Kammermayer et al., "Effect of Adsorption in Barrier Separation", Industrial & Eng. Chem. 50(9) Sep. (1958), pp. 1309–1310.

(List continued on next page.)

*Primary Examiner*—Robert Spitzer
*Attorney, Agent, or Firm*—Kenneth J. Stachel

[57] ABSTRACT

A hollow, porous, silica-rich fiber, a process for producing same, and a process for enriching at least one gas from a gaseous mixture utilizing at least one fiber to result in gas separations with good permeability and good selectivity. The fiber is non-crystalline and has pore sizes having a range of 1 to around 50 Angstroms in diameter and a mean pore size of around less than 20 Angstroms in diameter and a filament diameter in the range of 1 to around 250 microns and a wall thickness in the range of around 1 to 50 microns. The fibers with a fine pore structure and thin walls are produced by forming hollow glass fibers hindered or fully phase-separable boron and/or alkali metal glass composition, by attenuation from melt at speeds in the range of 500 ft/min to around 30,000 ft/min. The phase-separable glass fibers are heat treated to yield limited phase-separated hollow glass fibers and these fibers are leached to extract acid and/or water soluble components. For fully phase-separable, hollow glass fibers, a limited heat treatment is used before leaching, where the heat treatment is at a temperature of around 300 to less than 480° C. for a time of around 5 minutes to 24 hours. The hindered, phase-separable, hollow glass fibers are heat treated at a temperature in the range of about 400 to about 600° C. At least one hollow, porous, silica-rich fiber is used in a device suitable to contain a gaseous mixture and the permeate is withdrawn from the silica-rich fiber at the opposite side from that at which the gaseous mixture contacts the hollow, porous fiber.

37 Claims, No Drawings

OTHER PUBLICATIONS

Huckins et al., "The Separation of Gases by Means of Porous Membranes", Chem. Eng. Prog., 49(4) Apr. 1953, pp. 180–184.

Shindo et al., "Possibility For Adjustment of $H_2$/CO Ratio in Synthesis Gas by Means of Porous Glass Membranes", Int. J. of Hydrogen Energy, vol. 10, No. 1, pp. 27–30, 1985.

Shindo et al., "Gas Diffusion in Microporous Media in Knudsen's Regime", J. of Chem. Eng. Jpn., vol. 16, No. 2, 1983, pp. 120–126.

Tsujikawa et al., "Separation of Benzene & Nitrogen by Permeation Through Porous Vycor Glass", Kagaku Kogaku Ronbunshu, 11(5), 1985, pp. 534–541.

Scherer et al., "Stress in Leached Phase-Separated Glass", J. of American Ceramic Soc., vol. 68, No. 8, Aug. 1985, pp. 419–426.

McAfee, Jr. "Helium & Diffusion Separation", Bell Laboratories Record, vol. 39, Oct. 1961, pp. 354–358.

Hwang et al., "Surface Diffusion in Microporous Media", The Canadian J. of Chem. Eng., Apr. 1966, pp. 82–89.

Lee et al., "The Transport of Condensible Vapors through a Microporous Vycor Glass Membrane", J. of Colloid & Interface Sc., vol. 110, No. 2, Apr. 1986, pp. 544–555.

"Research on Porous Glass Membranes for Reverse Osmosis", Office of Saline Water, Dept. of Interior, Washington D.C. from the Stanford Research Institute.

Shindo et al., "Separation of Gases by Means of a Porous Glass Membrane at High Temperatures", J. Chem. Eng. Jpn., vol. 17, No. 6, 1984, pp. 650–652.

Bledzki et al., "Corrosion Phenomena in Glass Fibers & Glass Fiber Reinforced Thermosetting Resins", Composites Sc. & Tech. 23 (1985), pp. 263–285.

61-204006, (Japan), 9/10/86 Abstract Only.

"Porous, Melt-Molded Boric Silica Glass Filters", An Original Development of the Government Industrial Research Institute, Osaka, p. 13.

Product Brochure entitled "Fuji Porous Glass Filter" from Fuji Filter.

PROCESS OF GAS ENRICHMENT WITH POROUS SILICEOUS-CONTAINING MATERIAL

This application is a continuation-in-part patent application of Serial No. 871,731 filed June 6, 1986 now abandoned.

The present invention is directed to separating or enriching one gas or condensible vapor from one or more other gases and/or condensible vapors in a gaseous mixture with a porous siliceous material and the processes of making and using the porous material.

Sundry types of membranes enable the separation of one gas or condensible vapor from one or more other gases and/or vapors in a gas mixture. These types of membranes include: polymer membranes, glass membranes, and composite or multicomponent membranes. The application of these membranes to separating gases addresses the need to enrich, separate, or isolate one gas from another in areas such as: chemical processing, petroleum processing, oxygen replenishing or carbon dioxide removal from air in sealed vehicles such as airplanes, space vehicles and submarines.

One example of the usefulness of separation or enriching membranes in the chemical process industry is the separation of helium from methane. Helium is not present in nature in pure form but only as a component of gaseous mixtures, as in natural gas. Also, helium occurs in by-product gas mixtures resulting from various chemical processes and/or treatments. The most widely used commercial process for separating helium from natural gas involves low temperature fractionation. Since helium is normally found in natural gas in concentrations of around 400 parts per million to 8 volume percent of natural gas, this separation process requires cooling of extremely large quantities of gas to temperatures low enough to liquify all of the gases except helium. The size of such a plant and the expensive equipment involved provides an impetus for utilizing membranes to separate helium from methane. Other examples in the area of chemical or petroleum processing include: removal of acid gases from fuel gas sources and synthesis gas in the area of gasification of fossil fuels, separation of carbon dioxide in the presence of other acid gases (secondary oil recovery), and oxygen separations from chlorine in chlorine production. Also the membranes find application in gas analysis by their incorporation into analytical gas analyzing instruments.

Materials that are candidates for membranes must meet both physical and chemical requirements as well as yielding good membrane requirements. The physical property requirements include: good performance in the areas of tensile strength, tear strength, abrasion resistance, flexibility, dimensional stability for a wide range of thermal and chemical conditions, stress crack resistance, strength to withstand compaction in high-pressure utilization, good toughness and morphological stability for a reasonable period of time. Some chemical property requirements involve good performance in such areas as stability to withstand temperature fluctuations, chemical resistance, and maintenance of morphology and microstructure even under severe pressure changes. In addition, the materials should exhibit good membrane properties of selectivity with adequate permeability. The right combination of permeability and selective separation and the thinnest possible form available embodies a membrane that would be useful in the gas enrichment or separation areas.

The glass membranes in the form of porous thimbles in multicomponent membranes proved useful in the gas separations of: hydrogen from hydrogen sulfide, and helium from methane. Researchers at the National Chemical Laboratory for Industry in Japan reported the separation of a helium and carbon dioxide gas mixture by means of a porous glass membrane in the form of a thimble utilizing cocurrent flow in a temperature range of 296° to 947° C. (564.8° F.–1,736.6° F.). Researchers at the State Scientific-Research Institute of Glass; State Scientific-Research Institute of the Nitrogen Industry in the Soviet Union reported silica-rich highly porous glasses, approximately 96% $SiO_2$ in the form of microporous glass tubes were useful as semipermeable membranes. In this work, the unchanging permeability coefficient over a wide range of pressures in numerous experiments indicated the Knudsen type gas flow through the glass. Also it has been shown that the high-purity, nonporous, silica glass membranes can purify helium from natural gas and other sources since this smallest of gas molecules (2 Angstroms) can pass through the membrane via defects in the glass structure. German researchers (British Patent No. 1,271,811) utilizing a porous substrate with a nonporous glass glazing were successful in separating helium from methane. In the aforementioned work with porous high-silica containing glasses, a heat treatable borosilicate glass composition was used which was known as Vycor glass compositions available from Corning Glass Works. This composition has an amount of boron oxide in the range of about 20 to 35 weight percent and an amount of soda of 4 to 12 weight percent with the balance being silica. These glass compositions are phase separated upon heat treatment and are leached to remove a majority of the boron oxide and alkali metal oxides to leave around 96 weight percent silica-rich material.

In U.S. Pat. No. 4,042,359, the Vycor glass composition is used in forming porous capillaries. The capillaries having an outer diameter in the range of 40 to 140 microns since the internal diameter ranges from 30 to 80 microns and the wall thickness ranges from 5 to 30 microns. These capillaries are heat treated at a temperature ranging from 500° to 650° C. for a total of 5 minutes to 50 hours. These heat treated capillaries are acid leached to produce porous capillaries having pore sizes of 11 Angstroms up to diameters of 1000 Angstroms. Smaller pore diameters can be achieved by shrinking the porous capillary. Heat treatment at about 700° to 800° C. effects shrinkage to produce pore sizes with diameters down to less than 5 Å. The porous capillaries are useful in reverse osmosis water desalination processes.

In the area of membranes used for gas enrichment or separation, additional enhancements of this technology await the development of thinner, yet stronger membranes with uses under wider temperature conditions and with improved chemical durability.

SUMMARY OF THE INVENTION

The present invention includes:
(a) a process of preparing a gas separation and/or enrichment material that is at least one porous, silica-rich, hollow, inorganic fiber and the material that is made; and
(b) a process of separating or enriching at least one gas or condensible vapor from a mixture of gases and/or condensible vapors.

The gas separation and/or enrichment material has particular form and dimensions, composition and fine pore morphology. The form is a porous, hollow fiber having outer diameters in the range of around 1 to around 250 micrometers, um, (microns) and wall thicknesses in the range of around less than 1 micron to around 50 microns. Suitable lengths for the hollow fibers are those that are effective to permit a gaseous and/or vaporous mixture to contact one surface while permitting an enriched gaseous or vaporous stream to be collected. The process of preparing the silica-rich composition of the porous, hollow fiber includes: forming hollow glass fibers of phase-separable glass compositions, heat treating the formed fibers at temperatures less than those needed to phase-separate the fibers, and leaching the acid soluble components of heat-treated glass fibers. Formation of the hollow fibers occurs at attenuation rates of around 500 to 30,000 or more feet/min. The fiber issues from a bushing having orifices designed to deliver gas pressures sufficient to give the fiber an inner to outer diameter ratio of around 0.2 to around 0.96 and outer diameters in the range of 1 to around 250 micrometers and a wall thickness of around less than 1 to around 50 micrometers. The glass composition of the hollow fibers is phase-separable ranging from hindered, phase-separable to fully phase-separable siliceous-containing compositions with at least 20 weight percent leachables. The leachables are materials soluble in appropriate acids, (those other than hydrofluoric acid) and/or water soluble materials. The hollow glass fibers are heat treated at temperatures ranging from 300° C. to 480° C. for the fully phase-separable glass fibers to from 400° to 600° C. for the hindered, phase-separable glass fibers. The heat-treated hollow glass fibers are leached with appropriate acids and/or water to extract those leachable materials.

The hollow porous fibers produced by the aforedescribed process have a fine pore morphology relating to pores having pore sizes in diameters in the range from around 1 to 50 Angstroms with a mean average pore size in the range of around 1 to 30 Angstroms. The pore sizes and the average pore size have good uniformity throughout the thin walls of the hollow fibers. This type of hollow glass fiber results from standard heat treatment of hindered, phase-separable hollow glass fibers or from limited heat treatment of phase-separable borosilicate and alkali metal silicate glass compositions. The former approach involves heat treated glass compositions, where the glass compositions have a reduced tendency to phase separate; for example, binary and tertiary glass systems having ions with lower ionic potential reduced ionic size or increased ionic field strength. A reduced tendency for phase separation occurs when the glass composition has present at least one oxide of Group IVB of the Periodic Table of Elements or alkali metal oxides in decreasing order of effectiveness for retarding phase separation: Cs, K, Na, Li and aluminum oxide or a mixture thereof. The latter approach involves heat-treated, phase-separable borosilicate glass compositions that were heat treated at a temperature in the range of about 300° C. to less than 480° C. for an effective period of time.

The process of separating gases and/or condensible vapors involves using the porous hollow fibers so that the gaseous mixture contacts one side of at least one of the porous hollow fibers, and enriched or separated gas is removed from the same side or from the opposite side. If the gaseous mixture contacts the exterior surface of the porous hollow fiber, the opposite side is the lumen or interior surface of the hollow fiber. In this case the gaseous mixture would be removed from the same side of the porous hollow fiber that it initially contacted. Either the lumen or the exterior surface of the hollow glass fiber can be the side for initial contact by the gaseous mixture. The at least one porous hollow fiber is housed in a suitable apparatus to contain the gaseous mixture and provide for removal of the gaseous mixture at one location and of the permeate from a separate location connected to the opposite side of the porous hollow fiber. The conditions of separating or enriching include thermodynamic driving forces and temperatures in the range of sub-ambient to elevated temperatures below the softening point of the silica-rich fibers.

DETAILED DESCRIPTION OF THE INVENTION

In the following description and in the claims, the following terms have the described meanings.

The term "gas" includes permanent gases that are gases at less than extreme conditions of temperature and/or pressure, and any condensible vapors including less-easily condensed vapors that are condensible at conditions other than those used in the feed gas for enrichment or separation.

The term "perm selective" means permeable to different extents to different molecular species under equal driving force.

The term "ultrafiltered type" means transport is partially by a porous mechanism but membrane/penetrant interactions are also important.

The term "permeability factor" represents the steady state rate of gas transmission through a membrane. Values for permeability factors are not ordinarily normalized for membrane thickness. For homogenous membranes, the permeability factor is inversely proportional to the sample thickness. When the thickness of the active part of the membrane is not known, e.g., in asymmetric membranes, the permeability factor is still a valid permeability characterization. The permeability factor values determine the value-in-use of the membrane in permeation devices. The derivation of the permeability factor equation is as follows: the volume of gas transmitted through a membrane is directly proportional to the area, time and pressure of the permeation test as:

permeability factor = volume divided by area x time x pressure The units selected for volume, area, time and pressure are $cm^3$ (STP), $cm^2$, second, and cm of mercury, respectively.

The term "gas separation" means separations ranging from 100 percent separation to enrichment of a gas in any concentration over and above that of the original gaseous mixture.

The term "separation factor" or "selectivity" for a membrane and for a given gaseous mixture including gases A, B, ... N is defined as the ratio of the permeability constant ($P_a$) of the membrane for gas (A) to the permeability constant ($P_{others}$) of the membrane for the other gases in the mixture. The separation factor is also equal to the ratio of the permeability factor ($P_a/1$) of a membrane of thickness "1" for gas "a" of a gas mixture to the permeability factors of the same membrane to the other gases ($P_{others}/1$), wherein the permeability constant or permeability for a given gas is:

$$P = \frac{\text{Volume}(STP) \times \text{thickness}}{\text{area} \times \text{time} \times \text{pressure}}$$

and is expressed in units as $P = (cm^3(STP) \times cm) / (cm^2 \times \text{second} \times cm \text{ of mercury})$. In practice, the separation factor with respect to a given pair of gases in a binary gaseous mixture for a given membrane can be determined by employing numerous techniques which provide sufficient information for calculation of permeability constants or permeability factor for each of the pair of gases in the binary mixture. Several of the many techniques available for determining permeability constants, permeabilities and separation factors are disclosed by the work entitled "Techniques of Chemistry", Vol. VII, Membranes & Separations, by Hwang et al., John Wiley & Sons, 1975, herein incorporated by reference at Chapter 12, pages 296–322.

The terminology "porous separation membrane" relates to membranes which may have continuous porous channels for gaseous flow that communicate between the interior surface and the exterior surface, or which have numerous fine pores in the range of 1 to 50 Angstroms, where a majority of the pores interconnect. Also the term refers to porous materials which have numerous pores in the range of 1 to 50 Angstroms and which may have interconnecting pores for gaseous flow between the interior surface and the exterior surface. In other words, the membrane has considerable internal void volume related to continuous porosity from one side.

The term "selectivity" is defined as the ratio of the rate of passage of the more readily passed component of a gaseous mixture to the rate of passage of the less readily passed components. Selectivity may be obtained directly by contacting a membrane with a known mixture of gases and analyzing the permeate. Alternatively, a first approximation of the selectivity can be obtained by setting up the ratio of the rates of passage of the two or more components determined separately on the same membrane. The rates may be expressed as GcB units which are centibarrers as determined from the gas transmission rate.

Permeability can be measured by the variable pressure method or the variable volume method, both methods are well known to those skilled in the art.

The term "phase-separated" refers to glass fiber compositions that form immiscible phases upon heat treatment. After the appropriate heat treatment, the size of the composition fluctuations are greater than the size of a critical nucleus of 20 Angstroms. The term "non-phase-separated" refers to single-phase glass compositions and to phase-separable glass compositions that can be cooled rapidly enough for given fiber dimensions to prevent phase separation. The non-phase-separated glass composition includes phase-separable glass compositions that would phase-separate upon appropriate heat treatment subsequent to formation (post-formation heat treatment). Generally, non-phase-separated glass compositions are those in which the size of the composition fluctuations are less than the size of a crital nucleus of 20 angstroms. Mechanisms for describing the formation of new phases include the classical nucleation and growth mechanisms. Here, there is a sharp boundary between phases with a measurable interfacial energy and the new stable phase is defined by a critical nucleus size. For glasses, critical nucleus size has been estimated to be larger than 20 Å as shown in "Direct Measurements of Homogeneous Nucleation Rates in a Glass-Forming System", by J. J. Hammel, *Jl. Chem. Physics*, Vol. 46, No. 6, pp. 2234–2244 (1967), hereby incorporated by reference. Glasses can also phase separate by a mechanism of "Spinodal Decomposition" in which small fluctuations in composition grow rapidly when the glasses are in the spinodal region of a miscibility gap. Here, initially, there is no sharp boundary or interfacial energy between phases, and the inhomogeneities (or composition fluctuations) are points of maximum concentration of one component that gradually move to maximum concentration of the second component, e.g., $SiO_2$ to $B_2O_3$ in a borosilicate glass. This type of structure is also found above the miscibility gap, where there are similar fluctuations in composition even in a single phase glass melt. Therefore, glass structure in the initial stages of spinodal decomposition cannot be distinguished from the structure of a single phase glass. Sharp boundaries with measurable interfacial energies are a necessary requirement for two-phase systems (e.g., phase-separated glass). These conditions are not approached in spinodal separating systems until the phases are at least the size of a critical nucleus of around 20 Angstroms. Even in non-phase separated glass leaching can produce some pores with diameters greater than 20 Angstroms. It is believed this results from such factors as inhomogeneity and compositional fluctuations in the glass.

Specific types of heat treatment of already formed, phaseseparable fibers (post-formation heat treatment) are required subject to the specific composition of the fiber to achieve phase separation. Use of temperatures up to the annealing temperature of the glass for such heat treatment can result in densification and little or no phase separation. Upon densification the fiber becomes more difficult to leach and the resulting pore structure consists of smaller diameter pores. If the temperature of post-formation heat treatment is just above the annealing range, with a glass viscosity of 12 or greater, phase separation will occur but very slowly. Here the resulting pore structure of the fiber after leaching is slightly larger than when a heat treatment occurs at the lower temperature. With a temperature of post-formation heat treatment much higher than the annealing temperature, phase separation occurs more rapidly. The resulting pore structure in such a situation is much larger. Hence fibers subjected to post-formation heat treatment resulting in limited phase separation or less than full phase separation will have gas permeabilities lower than porous glass produced from full phase separation. Also, the porous fibers resulting from post-formation heat treatment at or below the annealing temperature of the glass will have still lower gas permeabilities. The annealing temperature is that temperature where volume differences within the glass, which result in stresses, and thus the stresses are removed as the volumes approach that volume characteristic of the holding temperature. The annealing point has been designated as that temperature where the viscosity of the glass is $10^{13.4}$ poise.

It is believed without limiting the scope of the invention that the porous, hollow, silica-rich fiber membranes of the present invention acts as a membrane, where the gaseous separation is due to more than size exclusion and penetrant interactions but also includes interactions with the porous walls to give good permeability and good selectivity.

For a better understanding of the invention, the term "extractable" for a group of components refers to metal oxides and associated materials which are leachable from borosilicate, phase-separable glass fibers by acids other than hydrofluoric acid. Hydrofluoric acid cannot be used since it attacks silica. Also the term "non-extractable" for the group of components refers to silica and metal oxides of Group IVB of the Periodic Chart. These materials are not leachable from the glass by acids other than hydrofluoric acid. Also the terms "associated material" refers to an interconnected structure of interaction products of the components of the extractable group or the non-extractable group or of the components from both groups because of their proximity to each other in the glass fibers. Nonexclusive examples of associated materials include alkali metal borates, alkali metal aluminates, other interaction products with aluminum oxide and the like.

The porous, hollow, silica-rich fibers of the present invention are prepared from a formulated fiberizable batch composition to result in, pore generating, non-phase separated but hindered or fully, phase-separable, glass fibers. The batch composition is formulated to enable the resulting glass fibers to have a balance of the two groups of components, i.e., the extractable group including associated materials and the non-extractable group. Typical batch materials known to those skilled in the art can be used and calculated by known methods to produce the glass compositions with the components of the two groups.

In the pore generating glass fiber composition, the components and associated materials of the extractable group are present in an amount of at least 15 to around 60 volume percent and include: one or more boron-containing materials; alkali metal oxides ($R_2O$); alkaline earth metal oxides like bivalent oxides (CaO, MgO); trivalent oxides like $Al_2O_3$, and $Fe_2O_3$ and oxides such as $TiO_2$, $SnO_2$, and $P_2O_5$. In addition, trace amounts of materials usually present in trace amounts in glass fibers can also be present like fluorine. The total amount of the components of the extractable group in the glass fibers is preferably at least 30 volume percent of the total glass composition. The presence of the $R_2O$ and/or $B_2O_3$ materials also serve as a fluxes in producing the glass fibers.

In the extractable group, the concentration of boron-containing material, boron oxides and/or anhydride and associated materials having boron, should not be too great that the softening point of the glass fibers decreases to cause the fibers to stick together during any heat treatment. This tackiness complicates the maintenance of individual fiber identify and, for discrete lengthy fibers, the maintenance of any near parallel alignment during subsequent processing steps.

The components of the non-extractable group include: the siliceous material such as silica and any refractory glass modifiers like the tetravalent oxides of zirconium and/or titanium and/or hafnium.

Any phase-separable glass compositions (those that separate into phases upon heat treatment) within the range of the aforelisted compositions having little, if any, refractory glass can be used in the present invention. This includes those having high concentrations of boron-containing materials, i.e., around 40 to around 60 weight percent of the total glass composition. The hindered phase separable glass compositions (those that phase separate upon heat treatment but that contain at least one refractory glass modifiers) also are useable in the present invention. Both the phase-separable and the hindered phase-separable glass fibers are used in heat-treated but generally non- phase-separated form resulting from heat treatment. Examples of the hindered, phase-separable glass compositions include: the borosilicate, or alkali metal silicate that have refractory glass modifiers such as metal oxides from Group IVB of the Periodic Table, aluminum oxide and alkali metal oxides in decreasing order of hinderance of phase separation Cs, K, Na, Li, oxides and mixtures thereof.

A suitable hindered phase-separable alkali metal silica glass composition for forming hollow fibers has around 29 weight percent sodium oxide ($Na_2O$), 62 weight percent silica ($SiO_2$), and 9 weight percent zirconium oxide ($ZrO_2$). For these types of glass compositions, the amount of alkali metal oxide $R_2O$ can range from about 20 to about 40 weight percent and the amount of metal oxide of the Group IV metal can range from about 1 to about 20, preferably less than 12 weight percent $ZrO_2$, with the remainder being silica.

When the content of boron-containing material is 0 to slightly greater than zero, the amount of alkali metal oxides ($R_2O$) can be a major component in the extractable group. When the amount of boron-containing compound is in the range of less than 20 weight percent of the total resulting glass composition, one or more of the other aforelisted inorganic oxide components are present in the extractable group. When the amount of boron-containing material is around 35 weight percent and up to 60 weight percent of the total resulting glass composition, the boron-containing material components constitute the majority and the other inorganic oxide components constitute the minority of the extractable group.

Regarding the other components in the glass fiber that can be considered in the extractable group, the aluminum oxide can be present in an amount in the range of 0 to about 15 weight percent of glass composition. This amount is generally less for higher amounts of boron-containing materials in the glass fibers and larger for lower amounts of boron-containing materials in the glass fibers. The amount of $R_2O$ components range from less than one weight percent up to around 15 weight percent, when higher amounts of boron-containing components are present. Also there can be present, especially with lower amounts of boron-containing components, calcium oxide (CaO) and magnesium oxide (MgO). The total amount of these components can be in the range of 0 to about 30 weight percent of the glass composition.

The amount of siliceous material should not be less than around 30 and preferably not less than 40 weight percent of the total glass composition. Generally, the siliceous material is less than around 80, preferably less than around 70 weight percent of the total glass composition. The metal oxides such as zirconium and/or titanium and/or hafnium can be present in amounts from around 1 to about 20 weight percent of the glass composition. Preferably, zirconium oxide is present in an amount of up to about 8 weight percent. Since these oxides have good acid insolubility, they are present with silica in the porous hollow fiber. These metal oxides not only render porous fibers having better alkaline stability, but they also enable substitution of the tetravalent oxides of zirconium and/or titanium and/or hafnium for one or more of the components of the extractable group. Their presence not only results in controlling porosity (by decreasing porosity without altering the amount of silica), but it also results in more alkaline stable, porous, silica-rich fibers.

The fully phase-separable borosilicate glass compositions include those pioneered by Hood and Nordberg for Corning Glass Company as described in U.S. Pat. Nos. 2,106,744; 2,215,039; 2,221,709; 2,286,275; 2,461,841 and 2,494,259 and the article enttled "Properties of Some Vycor-brand Glasses", M. E. Nordberg, Journal of the American Ceramic Society, Vol. 27, No. 10, pgs. 299–305, all of which are incorporated herein by reference. Generally, the Vycor-brand glass composition has: $B_2O_3$ in an amount of 20–35 weight percent, alkali metal oxide in an amount of 4–12 weight percent and silica in an amount of not less than 56 and not more than 75 weight percent. Also aluminum oxide may be present in an amount of not more than around 12 weight percent.

Another particularly useful, fully phase-separable glass composition for increased porosity is a glass having a low silica and high-borate content. Generally these glasses have amounts in weight percent of silica at 30 to 50 percent by weight, boric oxide at 40 to 55 percent by weight, alkali metal oxide at 5 to 15 percent by weight, aluminum oxide from 0 to 4 weight percent and zirconium oxide about 1 to about 4 weight percent.

The glass batch compositions are melted in a furnace at temperatures and times to obtain a fiberizable viscosity for the molten glass without devitrification. Generally, the batch is heated to 2000° F. (1093° C.) to 3000° F. (1649° C.) for 1 to about 6 hours or longer. The molten glass is attenuated from the orifices of a bushing located on a forehearth connected to the furnace. The bushing has tubes aligned and associated with the orifices and connected to a supply of gas at a superatmospheric pressure to allow for a continuous flow of gas to the vicinity of the orifice. The flow of gas can be uniform to produce continuous glass fibers, or can be intermittent to produce intermittent hollow glass fibers. A further description of the production of hollow and intermittent glass fibers is given for a direct melt system in U.S. Pat. Nos. 3,268,313; 3,421,873 and 3,526,487, all hereby incorporated by reference. In the alternative to melting batch for feeding to the bushings, a marble melt or other types of indirect melt operations can be used.

Preferably, the productin of hollow glass fibers of the instant invention results in good concentricity of the central lumen of the fibers for two basic reasons.

First, the bushing tip is firmly affixed to the faceplate of the bushing. The aligned tube through which the gases are introduced to provide the central lumen of the glass fibers as they are being formed is also rigidly affixed to the bushing faceplate through a bracket member which forms a truss that prevents the tube from moving in any direction with respect to the faceplate itself. Thus, any warping of the faceplate during operation and consequent movement of the bushing tips carries with it an associated similar movement of the tube or conduit so that the gas introduced through the gas tube is always being introduced to the molten glass emanating from channels in the bushing tip at the same location. The established lumen of the resulting fibers is thus readily maintained at its formed diameter as is the outside diameter of the fiber. This provides for uniform K values (outer diameter/inner diameter) obtained in the strands herein produced. Preferably, the air tube extends beyond the tip of the orifice of the bushing to assist in producing hollow glass fibers with uniform K values.

Secondly, it has been found in some cases that by introducing the air stream into the glass at the exit point of the tip and at a larger diameter than heretofore used, characteristic bulging of the cone of the molten glass may be avoided. Further, a more stable attenuation process is achieved, and uniform concentric holes are provided in the glass fibers formed as the molten glass emanates from the bushing tip. This occurs because the diameters of the air stream and glass stream at the tip are in approximately the same proportion as the desired end product. Once again, the lumen is centrally located and is constantly in the same position (regardless of whether or not the bushing faceplate distorts) due to the firm connection between the bracket member, the bushing faceplate and the tube. Glass can flow freely into an area above the bushing tips in all instances, where the tubes are being held, since the bracket member is completely open in between the spaces between tabs and also through the holes located in the top of the bracket member. Welds between the tube and the bracket member and the solid connection or button formed by the side arm tabs of the brackets in the hole provided in the faceplate for the tabs provide a rigid, secure, truss-type attachment so that there is no movement of the tubes when faceplate distorts over time.

The attenuation of the glass fibers is conducted by mechanical means through winding or chopping, where in winding the fibers are grouped into a strand and wound onto a forming tube situated on a rotating mandrel of a winding apparatus. Any other method of forming and attenuating hollow fibers as known by those skilled in the art can also be used. As the fibers are attenuated at speeds on the order of around 500 to around 30,000 feet/minute into ambient temperature air they are cooled, and they can be treated with water or cooled air for additional cooling. The hollow glass fibers are collected separately or are gathered into one or more strands, usually by means of a gathering shoe. The fibers or strands are wound onto a rotating drum-type winder having a forming tube to produce a forming package. The collet on which the forming package rides usually rotates at high speeds to collect the strand or strands into the forming package. Such speeds generally can be around 4,400 or 6,000 revolutions per minute which continues until the winder is slowed to a stop and a forming package is removed. An example of the gathering and collecting of the glass fibers into a forming package is disclosed in U.S. Pat. No. 4,071,339 (Griffiths) and U.S. Pat. No. 4,049,411 (Long and Dent) where attenuation speeds of from about 2,000 to 20,000 feet per minute are achieved, both patents are hereby incorporated by reference.

It is believed without limiting the present invention, that the fast attenuation speeds assist in providing an open glass structure in the fiber to facilitate extraction of acid and/or water extractable components. Also, it is believed that rapid cooling of the fibers assists in producing an open network structure which allows leachable components to be extracted in reasonable time periods.

The strands of the hollow glass fibers can comprise any number of fibers known to those skilled in the art. The proper combination of bushing tip size and attenuation speed results in hollow fibers with diameters in the range from 1 to around 250 microns or more, but preferably from around 1 to around 80 microns. Fibers with diameters larger than around 200 to 250 microns are increasingly difficult to wind and may be formed in a manner similar to capillaries or tubes as is known in the art. The fibers can have a K factor of up to around 0.96 but preferably in the range of around 0.2 up to about 0.96. Best results are obtained when the hollowness of the glass fiber comprises around 10 to around 80 percent of the volume of the glass fibers. Fibers having more than 80 percent of their volume that is hollow can be unstable because of thin walls especially when the fibers are leached. Finer fibers with outer diameters of less than 40 microns also are subject to such volume percentages of hollowness. Preferably, the hollowness is found in such a manner that the wall thickness is in the range of around 1 to around 30 microns and preferably from 1 to around 10 and most preferably up to about 5 microns.

The hollow glass fibers and/or strands that are collected into the forms of multilayered package, either forming packages or roving packages, or into the forms of chopped fibers or strands, chopped or continuous fiberous or strand mats or batts are treated for pore generation through limited phase-separation of the glass and subsequent leaching of extractables with appropriate acid and/or water. The continuous fibers or strands may be removed from the collection packages by cutting parallel with the axis of the package or by rewinding onto larger diameter drums or can remain in the package, mat, or batt form for the generation of pores. Preferably the strands are cut from one or more multilayered packages by making one or more transverse cuts through the layers of the package. The length of the cut hollow glass fibers can be varied by varying the diameter of the forming package during winding of the hollow glass fibers or by rewinding the hollow glass fibers from the forming package onto a smaller or larger diameter package. The many layers of the hollow glass fibers which are removed from the package can be laid flat on a supporting surface. The supporting surface can be a fiberous mat, porous substrate, plate or tray or moving conveyor belt. Generally, the discrete lengths of hollow glass fibers obtained by this approach can range from about 1 inch to around 20 feet. Any other method known to those skilled in the art for removing the glass fibers from the multilayered package can be employed. For example, the fibers can be unwound from the package and disposed as chopped strand or continuous strand onto another supporting surface or holder or rotating drum, like one with a diameter of four feet or 20 feet. Preferably, the discrete lengths of glass fibers can range from about 0.25 inch (64 cm) to around 70 inches (180 cm) and most preferably only up to around 36 inches (91.44 cm).

Before the pores are generated in the hollow glass fibers as fibers or strands through extraction, any sizing composition present on the fibers can be removed through a solvent wash such as a water wash to remove a water soluble sizing composition. It is preferred not to have any sizing composition on the glass fibers, even though the sizing composition may protect the heat-treated, glass fibers during leaching to produce fine pores.

The post-formation heat treatment to achieve less than full phase-separation, i.e., limited phase separation, or no phase separation for the hollow glass fibers utilizes heat treatment conditions for the fibers that depend on the composition of the fibers. Heat treatment of fibers with hindered-phase-separable compositions initiates the formation of an interconnected structure of non-extractable components and the formation of an interconnected structure of extractable components. The heat treatment results in a mean pore diameter in the desired range for the porous hollow fibers. These hollow glass fibers are heat treated in a furnace usually at a temperature in the range up to 500° C. or preferably of about 400° to about 500° C. The temperature assists in controlling the porosity of the glass fibers as taught for glass in U.S. Pat. No. 3,758,284 hereby incorporated by reference. Generally the heat treatment is for a period of time from about 10 minutes to several days depending somewhat on the concentration for glass modifiers in the composition. Longer times require lower temperatures, while shorter times require higher temperatures within the given temperature range. Preferably, the porous, hollow, silica-rich fibers have a pore volume in the range of 0.5 to 1.2 cc/gm and most preferably up to 0.75 cc/gm and pore diameters in the range of around 10 to 50 Angstroms with a predominant percentage of the pore volume comprised of average pore diameters of around 20 Å or less. This is achieved by heat-treating the fibers at 470° C. for 6 hours. Afterwards, the fibers are cooled to ambient temperatures. For hollow glass fibers with fully phase-separable glass compositions, the heat treatment is limited. Heat treatment is performed in the aforedescribed manner, except the temperature is limited to up to around 480° C. or preferably a range of about 300° C. to less than 480° C.

The extraction for the heat-treated fibers generates pores by acid and/or water leaching of the glass fibers. The specific type of leaching depends on the phase-separated, glass composition. The generated pores have a diameter across some portion of the opening of the pore, whether the pore is circular, elliptical, cylindrical or asymmetrical in shape, to yield the desired mean pore diameter. The mean pore diameter of the pores generated can have a broad or narrow distribution.

The acid and/or water leaching can be conducted at a temperature ranging from sub-ambient to an elevated temperature up to boiling point of the acid or water. Preferably the temperature is in the range of ambient to around 95° C. The acid is any organic acid or any inorganic acid other than hydrofluoric acid but also can be any preconditioned variation of such organic or inorganic acid. The concentrations of the acids can be in the range of around 0.1 Normal to 12 Normal for an acid having a pKa similar to hydrochloric acid. Acids with lower pKa's can be used in more dilute solutions and acids with higher pKa's can be used in higher concentrations. Also the water and/or acid leaching solution may be preconditioned to have ions to reduce stress cracking occurrences. For example, ions of an alkali metal borate solution are useful as are ions obtained from leaching leachable glasses of any shape with reasonable surface areas for periods of time to provide sufficient quantities of ions. The time of leaching depends on the composition, the temperature of leaching and the concentration of the acid. Generally, the time is as short as around 5 minutes for the water or acid leaching of glass fibers with high concentrations of boron-containing extractables. The time is also as long as around 24 hours to 72 hours or longer for the boron-containing glass compositions with lower amounts of extractables. Maintenance of the concentration of the acid in a low acid pH range may assist in providing favorable leaching kinetics to result in a complete or near complete leaching reaction. Also, it is preferred in leaching the hollow glass fibers to seal the ends of the fibers with an acid resistant polymer to permit leaching only from the exterior surface of one or more fibers. This is helpful in those situations where it is difficult to remove the acid from the lumen after leaching. The continued presence of the acid might result in unwanted deposits in the lumen.

The hollow glass fibers with higher amounts of extractables are water-leached as the sole leaching step, or can be water leached, followed by an acid leach. In the water leach, the glass fibers are immersed in a water bath for a sufficient period of time, at a sufficient temperature to remove a substantial amount, if not all, of the water soluble boron-containing compounds in the glass fibers. The glass fibers are submerged in the water when the water is cool, and the temperature of the water is increased to an elevated temperature preferably around 80° to 100° C., most preferably around 95° C., for 1 to about 24 hours, preferably 3 hours or the fibers are submerged in the water at elevated temperatures. When the water leaching step is performed, it can be done in a vessel that accommodates agitation during leaching. If the temperature of the water bath falls below 80° C., there is less thorough leaching and there must be a substantial increase in the leaching times. The time of leaching depends on the temperature of the bath and size of the fiber being treated. It is preferable to keep the fibers aligned during the leaching process, by immobilization, usually by gluing the fibers on a porous support or backing. The volume ratio of water to glass fibers in the leaching bath can be about 2 to 8 volumes of water to one volume of glass fibers. Low water to glass fiber volume ratios slow the leaching process while higher volume ratios serve no particular advantage.

After water leaching, or when acid leaching is the sole leaching step the glass fibers are placed in a similar vessel to that described for water-leaching for acid leaching. Acid leaching is conducted in the aforedescribed manner but more preferably with a preconditioned acid solution, such as 0.1 to about 6 Normal, preferably, about 3 to 4 Normal hydrochloric acid, at temperatures around 50° C. to 100° C., preferably 60° C., for about 10 minutes to about 72 hours, preferably about 2 to about 24 hours. In the acid leach, the glass fibers are immersed in the acid bath for a sufficient period of time, at a sufficient temperature to remove a substantial amount, if not all, of the acid soluble compounds in the glass fibers. The glass fibers can be submerged in the acid when the acid is cool and the temperature of the acid is increased to the elevated temperature, or submerged in acid at an elevated temperature. Nonexclusive examples of other suitable dilute solutions of acids include sulfuric and nitric acid, or organic acids such as oxalic acid. The volume ratio of acid to glass fibers in the acid leaching step can be about 1 to about 2500 or more volumes of acid to one volume of glass fibers which will vary somewhat with the normality of the acid. Higher volume ratios can be used in continuous or batch operations with the reuse of the acid solution. The glass fibers are removed from the acid leaching solution, water washed to a pH of around 5 to neutral in the wash water after which the fibers are dried, preferably by air drying at around ambient to elevated temperatures for around 10 minutes to about 24 hours. Fibers may also be dried after air drying at the elevated temperatures of up to 200° C. or more. In any case, the elevated temperature should not be too high so as to destroy the pores of the fibers.

The fibers have a mean pore diameter which can be controlled to be in the range of greater than 0 to about 50 angstroms from the various aforementioned compositions and extraction operations. The lengths vary from long chopped fibers of 1 inch to 20 feet to near continuous fibers. The porous fibers have a pore volume in the range of about 0.15 to about 1.2 preferably 0.15 to 0.75 cc/gm and fiber diameters from preferably about 10 microns to about 70 microns. The pore diameter is in the range of around 1 to 100 angstroms, preferably the average pore diameter is less than 50 angstroms and preferably the majority of the pore volume is comprised of pores with an average pore diameter of less than around 30 angstroms.

The hollow, porous, silica-rich fibers of the present invention can be used for gas separations in any gas separating apparatus known to those skilled in the art. For example, the gas separation apparatus utilized by those skilled in the art for separating gases with the use of hollow polymeric fibers can also be used with the porous, hollow, silica-rich fibers of the present invention. Any of these apparatus that provide contact between a gaseous mixture and either the exterior surface or the lumen of at least one of the hollow, porous, silica-rich fibers and that provide for separate removal of the gaseous mixture and the permeate (separated gas) can be used. Removal of the permeate is from the opposite side of the fiber from which the gas mixture contact the hollow, porous fiber. An example of an apparatus that can be used is that shown in the article entitled "Helium and Diffusion Separation", by K. B. McAfee, Jr., Bell Laboratories Record, Vol. 39, pg. 358, October, 1961, hereby incorporated by reference. Nonexclusive examples of gases that can be separated from gaseous mixtures include such permanent gases as helium from natural gas or a helium/methane mixture like a 50/50 mixture; oxygen from an oxygen/nitrogen mixture or air; nitrogen from nitrogen/methane, natural gas and the like; carbon dioxide from a carbon dioxide/methane mixture; oxygen from an oxygen/chlorine mixture; and acid gases from gaseous mixtures containing same. Gas separations with the porous hollow fibers occur at temperatures from around ambient to elevated temperatures. The upper limit of the temperature depends on the decomposition temperature of any organic resin, if present, with fibers, for instance, and resin end-seal.

PREFERRED EMBODIMENT OF THE INVENTION

The glass forming, fiberizable, pore-generating batch composition is formulated by back calculations to result in hollow glass fiber composition that is not phase-separated before leaching of the extractable components. It is also preferred that the glass fibers have zirconium oxide or titanium oxide balanced with some aluminum oxide in an alkali metal borosilicate fiber glass composition to result in porous fibers with good alkaline tolerance.

The hollow glass fibers are formed by melting the batch at about 2600° F. (1427° C.) for around 3 hours and conditioning the melt for around one hour at 2600° F. (1427° C.), and mechanically attenuating the hollow glass fibers into air at ambient temperatures from a single-tip hollow fiber bushing melter preferably extended tip or flared tip bushing. The air flow to the hollow fiber bushing is satisfactory to result in the desired K factor of around 0.4 to around 0.96. For a single-tip bushing the air flow usually is in the range of greater than 0 to about $1 \times 10^{-4}$ cfm (cubic feet per minute). The attenuation speeds are preferably from around 1,500 to around 6,000 feet/min. or more. The hollow fibers formed with good concentricity to have a diameter in the range of about 3 microns to about 100 microns and most preferably about 10 microns to about 70 microns and to have a wall thickness of around 1 to about 30 microns most preferably 1 to 5 microns. The hollow glass fibers preferably are formed with the the application of an aqueous chemical treating composition (sizing). Preferably the size has a substantial amount of water (deionized) and a polyurethane film forming polymeric emulsion in an effective film forming amount, polyoxyalkylene polyol with a molecular weight of around 7,000, glass fiber wet lubricant in such an effective amount, a silylated polyether lubricant, in an effective lubricating and coupling amount and a mixture of ureido organosilane and epoxy organosilane coupling agents in effective coupling agent amounts. The fibers are wound into a cylindrical forming package having porous substrate secured around the circumference of the forming tube as in U.S. Pat. No. 4,689,255 hereby incorporated by reference.

The forming package has the fibers glued to the substrate and the fibers and substrate are cut parallel to the package longitudinal axis so that all of the layers of glass fibers can be removed from the package. These fibers with the substrate are laid straight on a support in a nearly parallel alignment, where the fibers usually have a discrete length of about 12 inches (30.5 cm). The fibers are heat treated at a temperature in the range of 300° to less than 480° C., where the temperature is increased from ambient to 400° C. in around one hour with the fibers present. The heat treating lasts for around 6 hours.

For acid leaching the hollow, heat-treated glass fibers are end-sealed with silicone rubber thinned with toluene and air cured for around 24 hours. The end sealing assists in preventing precipitate formation in the lumens of the hollow fiber. Alternatively, the fibers could be heat-sealed or end-sealed with epoxy resin or other suitable material. A plurality of blankets (fibers plus porous substrate) are contained in a suitable rack to allow agitation but still hold the fibers in the acid. The hollow glass fibers are leached with preconditioned acid with agitation, preferably, of about 2 to 4 Normal hydrochloric acid, at temperatures around 50° C. to 70° C., for about 8 minutes to about 8 hours, preferably about 1 to about 2 hours. Preconditioning of the acid solution involves leaching already formed glass fibers in an amount in the range of greater than 0.1 to over 100 gm of glass/liter of acid and most preferably around 10 to 30 gm/liter with the concentrated acid. Performance of preconditioning is at a temperature in the range of around 50° to 70° C. for a time of around 6 to 48 hours. When larger amounts of glass fibers are used, shorter times are employable. The preconditioned acid is separated from any remaining leached glass fibers, and this preconditioned acid with a normality of around 3 to 4 is used to leach hollow glass fibers. In a continuous process the performance of preconditioning of the acid is not continuously necessary, but can be performed at the beginning of the process and that preconditioned acid can be subsequently recycled.

In the acid leach, the hollow glass fibers are immersed in the acid bath for a sufficient period of time, at a sufficient temperature to remove a substantial amount, if not all, of the acid soluble boron-containing compounds in the glass fibers. The fibers typically may be submerged in the acid, when the acid is at the elevated temperature of preconditioning. The volume ratio of acid to glass fibers in the acid leaching step can be about 100 to about 2500 volumes of acid of one volume of hollow glass fibers which will vary somewhat with the normality of the acid. The hollow, silica-rich fibers are removed from the acid leaching solution, water washed to a pH of around 5 to neutral in the wash water after which the fibers are dried, preferably in air drying at ambient temperature to around 50° C. for around 10 minutes to about 24 hours. In addition, the fibers can be further dried by techniques known to those skilled in the art to result in uniform drying.

A plurality of the porous, hollow, silica-rich fibers may be placed in a pressurizable container having an inlet and two outlets. One end of each fiber at the same side of the container is sealed. The unsealed side of each fiber is located in one of the outlets of the container. This allows for flow of the gaseous mixture into the container so that the permeate passes through and exits the porous hollow fibers and exits the container via the appropriate outlet of the container. The unseparated gaseous mixture exits the container at the other outlet and can be recirculated to the inlet.

The invention along with alternative embodiments are illustrated further in the following examples.

EXAMPLE 1

Approximately 50 grams of hollow glass fibers with an outer diameter (OD) equal to 40 microns and an internal diameter (ID) equal to 30 microns were formed using a single tip bushing having an extended air tube design. The fibers were wound directly onto a cardboard forming tube with no binder at 1750 rpm from a melt of 2095° F. (1146° C.). The air tube had an internal air pressure of 5.4 inches (13.7 cm) of water. The glass composition of the glass fibers was as follows:

| Oxide | Weight Percent |
| --- | --- |
| Silica | 59.4 |
| Boron oxide ($B_2O_3$) | 27.0 |
| Soda ($Na_2O$) | 8.8 |
| Zirconium oxide ($ZrO_2$) | 3.6 |
| Aluminum oxide ($Al_2O_3$) | 0.8 |
| Ferric oxide ($Fe_2O_3$) | 0.3 |
| Trace Material | 0.1 |
| Percent leachables | Around 37 |

Trace materials include such oxides as: MgO, $TiO_2$, $K_2O$, $Cr_2O_3$, SrO, and BaO and fluorine.

Approximately 6 grams of the fiber were cut away from the forming package as 2½ inch (6.35 cm) wide ring. The ring was pulled taut at the opposite sides of the circumference and folded twice length-wise and stuffed into a 100 milliliter porcelain crucible. The crucible was placed into a muffle furnace which was programmed to heat from room temperature to 450° C. in one hour then hold at 450° C. for 6 hours at which time the crucible was immediately removed to ambient conditions. A 6 inch long piece of the heat treated material, approximately 1 gram by weight, was leached for 30 minutes in 1000 milliliters of 3 Normal HCl contained in a Pyrex dish at a temperature of 55° C. The sample was then rinsed repeatedly with deionized water.

In a similar manner to that of Example 1, hollow glass fibers can be made from compositions of Examples 2 through 9 of Table 1.

TABLE 1
LEACHABLE FIBER GLASS COMPOSITION FOR MEMBRANES

| Examples Oxide | 2 | 3 | 4 | 5 | 6 | 7 | 8 | 9 |
|---|---|---|---|---|---|---|---|---|
| $SiO_2$ | 59.0 | 65.7 | 63.7 | 39.8 | 54.5 | 52.5 | 39.8 | 52.4 |
| $B_2O_3$ | 27.6 | 21.7 | 19.0 | 47.1 | 34.2 | 36.2 | 50.7 | 36.1 |
| $Na_2O$ | 8.5 | 8.3 | 10.3 | 9.0 | 7.0 | 7.0 | 9.4 | 7.0 |
| $ZrO_2$ | 3.3 | 2.0 | 2.0 | 3.0 | 3.0 | 3.0 | — | 3.0 |
| $Al_2O_3$ | 1.2 | 2.2 | 2.2 | 1.1 | 1.1 | 1.1 | — | 1.1 |
| CaO | — | 2.7 | — | — | — | — | — | — |
| $Fe_2O_3$ | 0.3 | — | — | — | — | — | — | 0.3 |
| Trace Materials[1] | 0.1 | 0.1 | 0.1 | — | 0.2 | 0.2 | 0.1 | 0.1 |
| % Leachables | 36.1 | 32.2 | 34.0 | 57.2 | 42.3 | 44.3 | 60.1 | 44.6 |

[1]Trace materials include such oxides as: MgO, $TiO_2$, $K_2O$, $Cr_2O_3$, SrO and BaO and fluorine In preparing porous hollow fiber membranes, the hollow glass fibers of Table 1 are subjected to a heat treatment similar to that of Example 1. An exception is that the fully phase-separable glass compositions of Example 8 can be heat treated at a lower temperature in the range of about 300° C. to less than 480° C.

As an illustration, the hollow glass fibers having a composition of Example 2 of Table 1 are formed and made porous at the conditions listed in Table 2.

TABLE 2
FORMATION OF HOLLOW POROUS FIBERS

| Forming Conditions: | |
|---|---|
| Attenuation Speed (ft/min) | 3800 rpm |
| Bushing temperature (°F.)/(°C.) | 2095 |
| Sizing | None |
| Air Tip Pressure (inches of $H_2O$) | 5.4 |
| OD/ID/Wall Thickness (microns) | 40/30/5 |
| Heat Treatment (°C./hr.) | 450/6 |
| Leaching Conditions: | |
| Acid/Normality | HCl/3 |
| Preconditioning | None |
| Temperature/time (°C./hr) | 55/3 |
| Glass Weight/Acid Volume (gm/ml) | 0.75/1400 |

The Example 2 hollow, porous fiber was prepared according to the conditions listed in Table 2 in a manner similar to that for Example 1.

The hollow glass fibers can be prepared from a single tip bushing designed with an extended air tube. The fibers may be wound directly onto a cardboard forming tube. The air tip pressure from the extended air tube can be 5.4 inches of water. The fibers can be heat treated and leached in a manner similar to that for Example 1.

Several of the porous, hollow, silica-rich fibers of Example 2 were potted into single fiber capillary test cells. The cells are generally made with a ⅛ inch stainless steel tube approximately 2 inches (51 mm) long. An epoxy seal covers the fiber end internal to the cell and fills a short length, roughly 0.5 mm, of the fiber lumen to prevent gas from entering at that point. A second epoxy seal fills the space between the wall of the capillary tube and the hollow fiber for a length of approximately 10 mm to prevent escape of gas there, except for a small vent fiber or tube. When the capillary inlet is connected by fittings to a source of pressurized feed gas mixture, the components must Permeate the exposed walls from the exterior to the interior of the hollow porous fiber, which is approximately 1 inch long, and travel the length of the lumen to escape as permeate flow from the exit end of the hollow porous silica-rich fiber. The capillary cell is oriented vertically with the fiber exit at the upper end so that a collection cell filled with water can be placed over the extended tip of the porous hollow fiber.

The collection cell was a glass capillary tube having a 6 mm outside diameter and a 4 mm inner diameter which was sealed at one end and open at the other. The glass capillary was filled to overflowing with water so that the surface tension of the liquid allowed the glass capillary tube to be turned upside down over the extended hollow fiber from the capillary cell without any of the water dripping out. The permeate gas from the single fiber capillary test cell allowed for bubbling of permeate gas out of the exit end of the porous hollow fiber and the gas collected at the top end of the collection cell as a large bubble. The volumetric rate of water displacement was equated to permeate flux and a gas tight syringe was used to transfer a sample of the gas for analysis by gas chromatography. The permeability factor was calculated according to the formula $P/L = flux[cm^3(STP)/sec]$ divided by fiber area$(cm^2)$ X pressure drop(cm of mercury). The selectivity is the ratio of the permeability of the fastest permeating gas to that of the slower permeating gas.

Table 3 presents the data of the selectivities and permeabilities obtained for various gas separations for the porous hollow fibers of Example 2, where the feed pressure was 300 psig. Also Table 3 presents published data for gas separations by a commercial polysulfone fiber.

TABLE 3
SELECTIVITIES AND PERMEABILITY FOR POROUS HOLLOW FIBERS

| MEMBRANE MATERIAL | GAS MIXTURE | TEMPERATURE °C. | SELECTIVITY (Pfast/Pslow) Actual | SELECTIVITY (Pfast/Pslow) Knudsen predict | ESTIMATED PERMEABILITY FACTOR (P/L) ($cm^3 \times 10^{-6}$)/ $cm^2 \times sec \times Hg$ | |
|---|---|---|---|---|---|---|
| Example from Table 2 | $He/CH_4$ 50/50 | Room approx. 30 | 1100 | 2.0 | He | 32 |
| Example from Table 2 | $O_2/N_2$ 22/78 | Room approx. 30 | 1.75 | 0.94 | $O_2$ | 0.07 |
| (POLY-SULFONE) AS DESCRIBED IN U.S. PAT. NO. 4,472,175 AT TABLE 12 | $H_2/CH_4$ | | 69–80 | 2.8 | $H_2$ | 57–75 |
| | $O_2/N_2$ | | 4.5 | 0.94 | $O_2$ | 6–9 |
| | $CO_2/CH_4$ | | 30 | 1.7 | $CO_2$ | 24 |

In Table 3, the data were accumulated with a number of aforementioned single fiber capillary cells for each gas separation, and the average values are presented in Table 3. For example, the membrane material example from Table 2 in separating helium from the 50/50 mixture of helium and methane was tested in 6 single fiber capillary cells. The permeability factor P/L was calculated as follows:

P/L = permeate flux [cm$^3$(STP)/second]/membrane area (cm$^2$) × delta p(cm Hg)

for He:
delta p = partial pressure of Helium in feed minus partial pressure of Helium in permeate;
delta p = [(315 psia)(0.5) − (15 psia)(0.999)]76 cm Hg/15 psia = 722 cm Hg;
membrane area = 2(pi)(average radius)(fiber length);
membrane area = 2(pi)(17.5×10$^{-4}$cm)(3.8 cm) = 0.042 cm$^2$;
permeate flux = (0.999)[60 microliter(STP)/minute] × cm$^3$/1000 microliters × minutes/60 seconds = 9.99×10$^{-4}$cm$^3$(STP)/second;
Permeability factor (P/L) = (9.99×10$^{-4}$cm$^3$(STP)/seconds)/(0.042cm$^2$)(722 cm Hg);
Permeability factor (P/L) = 3.3×10$^{-5}$cm$^3$(STP)/cm$^2$×sec×cm Hg;
for CH$_4$
By the same calculation, P/L for CH$_4$ is equal to 3.0×10$^{-8}$
alpha He/CH$_4$ = selectivity = P/L (He)/P/L(CH$_4$) = 3.3×10$^{-5}$ divided by 3.0×10$^{-8}$ = 1100

For all of the separations of Table 3, the Knudsen separation factor was calculated based on the molecular weights of the gases being separated.

At the bottom of Table 3, there are presented published results for gas separations of a commercial polysulfone fiber.

From Table 3, the results show very good selectivity in the separation of the gases with a good permeability factor.

In accordance with the aforedescribed disclosure of hollow, porous, high silica fibers with fine pores and thin walls for separating gases from gaseous mixtures, we claim the following as our invention.

1. A process of enriching at least one gas from a mixture of gases utilizing a porous, silica-rich membrane material, comprising:
   using at least one hollow porous silica-rich fiber as a porous separation membrane that is non-crystalline and has pore sizes within the range of 1 to around 50 Angstroms in diameter, a mean or average pore size of around 5 to 50 Angstroms in diameter, filament diameter in the range of around 1 to 250 microns and wall thickness in the range of around 1 to 50 microns, wherein the silica-rich fiber results form extracting extractable components selected from the group consisting of acid extractable components and water extractable components or a mixture thereof, from hollow glass fibers formed by attenuation from melt at speeds in the range of at least 500 ft/min to around 30,000 ft/min where the glass fibers are selected from the group consisting of: hindered, phase separable, hollow glass fibers having a borosilicate, or alkali metal borosilicate glass composition with at least one oxide of a metal from Group IVB of the Periodic Table that are heat treated at a temperature in the range of 400 to 600° C. for about 0.5 to 12 hours; and phase-separable but non-phase separated borosilicate, hollow, glass fibers heat treated at a temperature in the range of about 400° to less than 480° C. for a time in the range of about 0.5 to 12 hours where the borosilicate glass fibers have an amount of boron oxide from above 40 to 60 weight percent, whereby membrane performance in terms of selectivities and permeabilities in gas separation can be enhanced over that performance predicted from Knudsen diffusion calculations.

2. Process of claim 1, wherein using the porous silica-rich membrane material includes:
   contacting the gaseous mixture with one surface of the hollow, porous, silica-rich fiber at temperature in the range of subatmospheric to elevated temperatures and at a pressure in the range of about 1 to 5,000 psi; and
   removing from the vicinity of the opposite surface of the hollow porous silica-rich fiber from the contact surface, a product enriched in at least one gas of said gaseous mixture.

3. Process of claim 1, wherein helium and methane are separated.

4. Process of claim 1, wherein helium is separated from the gaseous mixture selected from the group consisting of: helium and methane mixture and natural gas.

5. Process of claim 1, wherein nitrogen and methane or natural gas are separated.

6. Process of claim 1, wherein oxygen is separated from a gaseous mixture selected from the group consisting of oxygen and nitrogen, air, carbon dioxide containing air and oxygen and chlorine gaseous mixtures.

7. Process of claim 1, wherein acid gases are removed from acid gaseous containing gaseous mixtures.

8. Process of claim 1, wherein the gas separation fiber for separating at least one gas from a gaseous mixture, has:
   pore sizes within the range of 1 to around 50 Angstroms in diameter and a mean average pore size in the range of around less than 20 Angstroms in diameter and a filament diameter in the range of around 1 micron to 100 microns and a wall thickness in the range of around 1 micron to 10 microns, and wherein the silica-rich fibers result from extracting acid soluble components from the hollow glass fiber having a hindered, phase-separable borosilicate glass fiber composition with one or more oxides of a metal of Group IVB of the Periodic Table.

9. Process of claim 1, wherein the pore volume of the hollow, porous, silica-rich fiber is in the range of 0.15 to 0.75 cc per gram.

10. Process of claim 1, wherein the fiber diameter is less than 40 microns.

11. Process of claim 1, wherein the wall thickness is in the range of 1 to about 5 microns.

12. Process of claim 1, wherein the mean pore size is less than 20 Angstroms in diameter.

13. Process of claim 1, wherein the fiber diameter is in the range of 10 to 70 microns.

14. Process of claim 1, wherein the speed of attenuation is in the range of at least 1,500 to around 6,000 feet per minute.

15. Process of claim 1, wherein the fully phase-separable hollow glass fibers are heat treated at a temperature in the range of about 300° to 450° C. for incomplete phase separation.

16. Process of claim 1, wherein carbon dioxide is separated from a carbon dioxide and methane gaseous mixture.

17. Process of claim 1, wherein the amount of the metal oxide of Group IVB metal is in the range of about 1 to about 20 weight percent of the hollow glass fibers.

18. Process of claim 1, wherein the metal oxide of the Group IVB metal is zirconium oxide and its amount is in the range of about 1 to about 12 weight percent of the hollow glass fibers.

19. A process for enriching helium from a helium and methane gaseous mixture or from natural gas as a mixture utilizing a porous, silica-rich membrane material, comprising:
 (1) contacting the gaseous mixture with one surface of at least one hollow porous silica-rich fiber as a porous separation membrane that is non-crystalline and has pore sizes within the range of 1 to around 50 Angstroms in diameter, a mean or average pore size of around 5 to 50 Angstroms in diameter, filament diameter in the range of around 1 to 250 microns and wall thickness in the range of around 1 to 50 microns, wherein the silica-rich fiber results from extracting extractable components selected from the group consisting of: acid extractable components and water extractable components or a mixture thereof, from hollow glass fibers formed by attenuation from melt at speeds in the range of at least 500 ft/min to around 30,000 ft/min, where the glass fibers have a composition selected from the group consisting of: hindered, phase separable, hollow glass fibers heat treated at a temperature in the range of 400° to 600° C. for about 0.5 to 12 hours and phase-separable borosilicate or alkali metal borosilicate, hollow glass fibers heat treated at a temperature in the range of about 400° to less than 480° C. for a time in the range of about 0.5 to 12 hours where the borosilicates and alkali metal borosilicate glass fibers have an amount of boron oxide from around 40 to 60 weight percent, whereby membrane performance in terms of selectivities and permeabilities in gas separations can be enhanced over that performance predicted from Knudsen diffusion calculations, and where the contacting is at a temperature in the range of substmospheric to elevated temperatures and at a pressure in the range of about 1 to 5,000 psi; and
 (2) removing from the vicinity of the opposite surface of the hollow porous silica-rich fiber from the contact surface, helium gaseous product having an enriching amount of helium over that in said gaseous mixture.

20. A process of enriching oxygen from an oxygen and nitrogen gaseous mixture, air, carbon dioxide-containing air, or an oxygen and chlorine gaseous mixture utilizing a porous, silica-rich membrane material, comprising:
 (1) contacting the gaseous mixture with one surface of at least one hollow porous silica-rich fiber as a porous separating membrane that is non-crystalline and has pore sizes within the range of 1 to around 50 Angstroms in diameter, a mean or average pore size of around 5 to 50 Angstroms in diameter, filament diameter in the range of around 1 to 50 microns, wherein the silica-rich fiber results from extracting extractable components selected from the group consisting of: acid extractable components and water extractable components or a mixture thereof, from hollow fibers formed by attenuation from melt at speeds in the range of at least 500 ft/min to around 30,000 ft/min, where the glass fibers have a composition selected from the group consisting of: hindered, phase separable, hollow glass fibers heat treated at a temperature in the range of 400° to 600° C. for about 0.5 to 12 hours, and phase-separable borosilicate or alkali metl borosilicate, hollow glass fibers heat treated at a temperature in the range of about 400° to less than 480° C. for a time in the range of about 0.5 to 12 hours, where the borosilicate and alkali metal borosilicate glass fibers have an amount of boron oxide from 15 to 60 weight percent, whereby membrane performance in terms of selectivities and permeabilities in gas separations can be enhanced over that performance predicted from Knudsen diffusion calculations, and where the contacting is a temperature in the range of substmospheric to elevated temperatures and at a pressure in the range of about 1 to 5,000 psi; and
 (2) removing from the hollow porous silica-rich fiber, an oxygen gaseous product having an enriched amount of oxygen to that in said gaseous mixture.

21. A process for enriching carbon dioxide from a mixture of carbon dioxide and methane gases utilizing a porous, silica-rich membrane material comprising:
 (1) contacting the gaseous mixture with one surface of at least one hollow porous silica-rich fiber as a porous separation membrane that is non-crystalline and has pore sizes within the range of 1 to around 50 Angstroms in diameter, a mean or average pore size of around 5 to 50 Angstroms in diameter, filament diameter in the range of around 1 to 250 microns and wall thickness in the range of around 1 to 50 microns, wherein the silica-rich fiber results from extracting extractable components selected from the group consisting of: acid extractable components and water extractable components or a mixture thereof, from hollow fibers formed by attenuation from melt at speeds in the range of at least 500 ft/min to around 30,000 ft/min, where the glass fibers have a composition selected from the group consisting of: hindered, phase separable, hollow glass fibers heat treated at a temperature in the range of 400° to 600° C. for about 0.5 to 12 hours and phase-separable borosilicate or alkali metal borosilicate, hollow glass fibers heat treated at a temperature in the range of about 400° to less than 480° C. for a time in the range of about 0.5 to 12 hours where the borosilicate and alkali metal borosilicate glass fibers have an amount of boron oxide from 15 to 60 weight percent, whereby membrane performance in terms of selectivities and permeabilities in gas separations can be enhanced over that performance predicted from Knudsen diffusion calcuaitons, and where the contacting is at a temperature in the range of subatmospheric to elevated temperatures and at a pressure in the range of about 1 to 5,000 psi; and
 (2) removing from the vicinity of the opposite surface of the hollow porous silica-rich fiber from the contact surface, a carbon dioxide gaseous product having an amount of carbon dioxide over that in said gaseous mixture.

22. A process of separating nitrogen and methane from a gaseous mixture utilizing a porous, silica-rich membrane material, comprising:
 (1) contacting the gaseous mixture with one surface of at least one hollow porous silica-rich fiber as a porous separating membrane that is non-crystalline and has pore sizes within the range of 1 to around 50 Angstroms in diameter, a mean or average pore size of around 5 to 50 Angstroms in diameter, filament diameter in the range of around 1 to 250 microns and wall thickness in the range of around 1 to 50 microns, wherein the silica-rich fiber results from extracting extractable components selected from the group consisting of: acid extractable components and water extractable components or a mixture thereof, from hollow fibers formed by attenuation from melt at speeds in the range of at least 500 ft/min to around 30,000 ft/min, where the glass fibers have a composition selected from the group consisting of: hindered, phase-separable, hollow glass fibers heat treated at a temperature in the range of 400° to 600° C. for about 0.5 to 12 hours, and phase-separable borosilicate or alkali metal borosilicate, hollow glass fibers heat treated at a temperaure in the range of about 400° to less than 480° C. for a time in the range of about 0.5 to 12 hours, where the borosilicate and alkali metal borosilicate glass fibers have an amount of boron oxide from 15 to 60 weight percent, whereby membrane performance in terms of selectivities and permeabilities in gas separations can be enhanced over that performance predicted from Knudsen diffusion calculations, and where the contacting is at a temperature in the range of subatmospheric to elevated temperatures and at a pressure in the range of about 1 to 5,000 psi; and (2) removing from the vicinity of the opposite surface of the hollow porous silica-rich fiber from the contact surface, a nitrogen or methane gaseous product having an enriched amount of nitrogen or methane to that in said gaseous mixture.

23. A process for producing a gas enriching membrane, comprising:
(a) forming at least one hollow glass fiber having a composition selected from the group consisting of: extractable, hindered, phase-separable, boron and/or alkali metal silicates having at least one oxide of a metal from Group IVB of the Periodic Table; and extractable, fully phase-separable borosilicate composition having an amount of boron oxide in the range from 40 to 60 weight percent and/or alkali metal silicates both having an amount of at least 15 weight percent extractables by acids other than hydrofluoric acid, extractables or water extractables of at least 15 weight percent, where the hollow glass fibers have an outer diameter in the range of 1 to 250 microns (um) and have a wall thickness in the range of around 1 to around 50 microns (um) and have an inner to outer diameter ratio in the range of 0.2 to 0.96 and where the fibers are attenuated at a speed in the range of 500 to 30,000 feet/min. with rapid cooling of the fibers,
(b) heat treating the fiber at a temperature in the range of 400° to 600° C. for about 0.5 to 12 hours for hollow glass fiber selected from the group consisting of: hindered, phase-separable, hollow glass fibers having a borosilicate glass composition with at least one oxide of a metal from Group IVB of the Periodic Table and at a temperature in the range of about 300° to less than 480° C. for the same period of time for hollow glass fibers that are fully phase-separable boron and/or alkali metal silica compositions, where the borosilicate glass fibers have an amount of boron oxide from above 40 to 60 weight percent, and
(c) leaching the heat-treated, hollow glass fibers to remove extractables selected from the group consisting of: acid solubles with acids other than hydrofluoric, and water solubles and mixtures thereof to produce a porous, silica-rich, hollow fiber as a separation membrane having pores with diameters from 1 to 50 Å and with a mean pore diameter of less than 30 Å and with a pore volume in the range of around 0.15 to around 1.2 cms/gm.

24. Process of claim 23, wherein the forming of the glass fiber gives a fiber diameter of less than 40 microns, and the wall thickness is less than 20 microns.

25. Process of claim 23, wherein forming of the glass fiber gives a fiber diameter in the range of 1 to 80 microns.

26. Process of claim 23, wherein forming is at the attenuation speed in the range of 1,500 ft/min to around 6,000 ft/min.

27. Process of claim 23, wherein forming gives a hollow fiber having a wall thickness in the range of 1 to about 5 microns.

28. Process of claim 23, wherein the mean pore size is less than 20 Angstroms in diameter.

29. Process of claim 23, wherein the heat treating of the hindered phase separable glass fibers is at a temperature in the range of 400° to less than 480° C. for a time in the range of about 1 minute to 10 hours before the extractable materials are removed.

30. Process of claim 23, wherein the formed hollow glass fiber is collected for heat treating.

31. Process of claim 30, wherein the collected hollow fibers are cut and heat-treated.

32. Process of claim 23, wherein leaching is conducted at a temperature in the range of ambient to around 95° C.

33. Article of claim 32, wherein the specific surface of the hollow, porous, silica-rich fiber is in the range of 100 up to around 600 meters$^2$ per gram.

34. Process of claim 23, wherein in forming the glass fibers the amount of the metal oxide of Group IVB metal in the glass fiber is in the range of about 1 to about 20 weight percent of the hollow glass fibers.

35. Process of claim 34, wherein the metal oxide of the Group IVB metal is zirconium oxide and its amount is in the range of about 1 to about 12 weight percent of the hollow glass fibers.

36. Article of claim 32, wherein the majority of the pores have an average diameter less than 30 Angstroms.

37. Article of the process of claim 23.

* * * * *